US008412554B2

(12) United States Patent
Messer et al.

(10) Patent No.: US 8,412,554 B2
(45) Date of Patent: *Apr. 2, 2013

(54) METHOD AND SYSTEM FOR DESCRIBING CONSUMER ELECTRONICS USING SEPARATE TASK AND DEVICE DESCRIPTIONS

(75) Inventors: Alan Messer, Los Gatos, CA (US); Anugeetha Kunjithapatham, Sunnyvale, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1886 days.

This patent is subject to a terminal disclaimer.

(21) Appl. No.: 10/950,121

(22) Filed: Sep. 24, 2004

(65) Prior Publication Data

US 2006/0069602 A1    Mar. 30, 2006

(51) Int. Cl.
*G06Q 10/00* (2012.01)
(52) U.S. Cl. ...................................... 705/7.21
(58) Field of Classification Search .................. 705/7.21
See application file for complete search history.

(56) References Cited

U.S. PATENT DOCUMENTS

| 5,410,326 | A |   | 4/1995 | Goldstein |
| 5,530,861 | A | * | 6/1996 | Diamant et al. ............. 705/7.21 |
| 5,544,321 | A |   | 8/1996 | Theimer et al. |
| 5,555,376 | A |   | 9/1996 | Theimer et al. |
| 5,611,050 | A |   | 3/1997 | Theimer et al. |
| 5,812,865 | A |   | 9/1998 | Theimer et al. |
| 5,910,799 | A |   | 6/1999 | Carpenter et al. |
| 6,169,991 | B1 |   | 1/2001 | Tsukahara |
| 6,256,019 | B1 |   | 7/2001 | Allport |
| 6,389,288 | B1 |   | 5/2002 | Kuwahara et al. |
| 6,563,430 | B1 |   | 5/2003 | Kemink et al. |

(Continued)

FOREIGN PATENT DOCUMENTS

| EP | 0626635 | 11/1994 |
| EP | 0801342 | 10/1997 |

(Continued)

OTHER PUBLICATIONS

U.S. Office Action for U.S. Appl. No. 10/947,774 mailed Dec. 15, 2008.

(Continued)

*Primary Examiner* — Johnna Loftis
*Assistant Examiner* — Brandi P Parker
(74) *Attorney, Agent, or Firm* — Kenneth L. Sherman, Esq.; Michael Zarrabian, Esq.; Sherman & Zarrabian LLP

(57) ABSTRACT

A method of representing user tasks to be performed by one or more of a plurality of electronic devices in a task orchestration system. Each device includes therein a function description specifying a function that the device can perform. The function descriptions are obtained from one or more of the devices, task descriptions that describe device functionalities required for certain tasks are obtained, and task suggestion are generated based on the obtained device function descriptions and task descriptions. Each task suggestion represents a user task as an abstraction of on or more of the obtained device descriptions and task descriptions. The tasks suggestion are displayed on a display for the user to select from, wherein the user selected task suggestion is to be performed by orchestration (automation) of one or more of the devices based on task descriptions that use device functionalities described in the device function descriptions.

42 Claims, 7 Drawing Sheets

Task Orchestration

U.S. PATENT DOCUMENTS

| | | | |
|---|---|---|---|
| 6,792,323 | B2 | 9/2004 | Krzyzanowski et al. |
| 6,931,630 | B1 | 8/2005 | Cotner et al. |
| 6,954,737 | B2 | 10/2005 | Kalantar et al. |
| 6,957,075 | B1 | 10/2005 | Iverson |
| 7,024,256 | B2 | 4/2006 | Krzyzanowski et al. |
| 7,046,263 | B1 | 5/2006 | Abbott et al. |
| 7,064,675 | B2 | 6/2006 | Zigmond et al. |
| 7,076,255 | B2 | 7/2006 | Parupudi et al. |
| 7,123,925 | B2 | 10/2006 | Robinson et al. |
| 7,170,422 | B2 * | 1/2007 | Nelson et al. ............ 340/825.72 |
| 7,184,848 | B2 | 2/2007 | Krzyzanowski et al. |
| 7,206,559 | B2 | 4/2007 | Meade, II |
| 7,307,746 | B2 | 12/2007 | Inoue |
| 7,336,942 | B2 | 2/2008 | Wang |
| 7,346,663 | B2 | 3/2008 | Abbott et al. |
| 7,493,294 | B2 * | 2/2009 | Flinn et al. ....................... 706/12 |
| 7,522,549 | B2 | 4/2009 | Karaoguz et al. |
| 7,533,079 | B2 | 5/2009 | Naito et al. |
| 7,613,285 | B2 | 11/2009 | Hay et al. |
| 7,681,203 | B2 | 3/2010 | Mandato et al. |
| 7,707,267 | B2 | 4/2010 | Lisitsa et al. |
| 2001/0032132 | A1 | 10/2001 | Moran |
| 2002/0119788 | A1 | 8/2002 | Parupudi et al. |
| 2002/0138327 | A1 | 9/2002 | Mello et al. |
| 2003/0046401 | A1 | 3/2003 | Abbott et al. |
| 2003/0073412 | A1 | 4/2003 | Meade, II |
| 2003/0088534 | A1 | 5/2003 | Kalantar et al. |
| 2004/0068507 | A1 | 4/2004 | Inoue |
| 2004/0100505 | A1 | 5/2004 | Cazier |
| 2004/0163073 | A1 | 8/2004 | Krzyzanowski et al. |
| 2004/0176118 | A1 | 9/2004 | Strittmatter et al. |
| 2004/0187152 | A1 * | 9/2004 | Francis et al. ................... 725/58 |
| 2004/0230636 | A1 | 11/2004 | Masuoka et al. |
| 2005/0035846 | A1 | 2/2005 | Zigmond et al. |
| 2005/0055472 | A1 | 3/2005 | Krzyzanowski et al. |
| 2005/0108354 | A1 | 5/2005 | Lisitsa et al. |
| 2005/0114493 | A1 | 5/2005 | Mandato et al. |
| 2005/0164725 | A1 * | 7/2005 | Naito et al. ................... 455/517 |
| 2005/0232242 | A1 | 10/2005 | Karaoguz et al. |
| 2005/0246726 | A1 * | 11/2005 | Labrou et al. ................. 719/328 |
| 2005/0267770 | A1 * | 12/2005 | Banavar et al. ................... 705/1 |
| 2005/0283532 | A1 | 12/2005 | Kim et al. |
| 2005/0288035 | A1 | 12/2005 | Wang |
| 2006/0064693 | A1 | 3/2006 | Messer et al. |
| 2006/0064694 | A1 | 3/2006 | Messer et al. |
| 2006/0069602 | A1 | 3/2006 | Messer et al. |
| 2006/0147001 | A1 | 7/2006 | Ha et al. |
| 2006/0149905 | A1 | 7/2006 | Park et al. |
| 2006/0156252 | A1 | 7/2006 | Sheshagiri et al. |
| 2006/0156307 | A1 | 7/2006 | Kunjithapatham et al. |
| 2007/0233287 | A1 | 10/2007 | Sheshagiri et al. |
| 2007/0266384 | A1 | 11/2007 | Labrou et al. |

FOREIGN PATENT DOCUMENTS

| | | |
|---|---|---|
| EP | 1168124 A2 | 1/2002 |
| EP | 1431875 | 6/2004 |
| EP | 1458140 A1 | 9/2004 |
| FR | 2852173 | 9/2004 |
| JP | 11352446 | 12/1999 |
| JP | 2000-266551 | 9/2000 |
| JP | 2002-049556 | 2/2002 |
| JP | 2002-063033 | 2/2002 |
| JP | 2002116971 | 4/2002 |
| JP | 2002-533802 | 10/2002 |
| JP | 2004-266453 | 9/2004 |
| KR | 10-2000-0033089 | 6/2000 |
| KR | 10-2001-0014271 | 2/2001 |
| KR | 2001-0041425 | 5/2001 |
| KR | 2002-0022049 | 3/2002 |
| KR | 10-2003-0021251 | 3/2003 |
| KR | 1020050046580 | 5/2005 |
| KR | 10-2006-0043333 | 5/2006 |
| KR | 10-2006-0051202 | 5/2006 |
| KR | 10-2006-0051104 | 6/2006 |
| KR | 1020060068518 | 6/2006 |
| KR | 10-2006-0092993 | 8/2006 |
| KR | 10-2006-0063326 | 9/2006 |
| WO | WO 00/28436 | 5/2000 |
| WO | WO 00/38039 A1 | 6/2000 |
| WO | 00-39964 | 7/2000 |
| WO | 00/39964 A1 | 7/2000 |
| WO | WO 00/59230 | 10/2000 |
| WO | 01-69380 | 9/2001 |
| WO | WO 2004/031937 | 4/2004 |
| WO | WO 2004/062227 | 7/2004 |
| WO | 2004-081713 | 9/2004 |

OTHER PUBLICATIONS

U.S. Office Action for U.S. Appl. No. 10/948,399 mailed Mar. 17, 2009.

U.S. Office Action for U.S. Appl. No. 11/394,968 mailed Aug. 25, 2008.

U.S. Final Office Action for U.S. Appl. No. 11/394,968 mailed Feb. 12, 2009.

U.S. Office Action for U.S. Appl. No. 11/200,546 mailed Apr. 25, 2008.

U.S. Final Office Action for U.S. Appl. No. 11/200,546 mailed Oct. 15, 2008.

U.S. Advisory Action for U.S. Appl. No. 11/200,546 mailed Jan. 22, 2009.

European Search Report and Search Opinion; Application No. 06250036.8; dated Sep. 17, 2007.

Tim Berners-Lee, James Hendler, Ora Lassila, WC3 Semantic Web, Technology and Society Domain, "Semantic Web", http://www.w3.org/2001/sw/.

Tim Berners-Lee, James Hendler, Ora Lassila, "The Semantic Web: A new form of Web content that is meaningful to computers will unleash a revolution of new possibilities", Scientific American.com, May 17, 2001. http://www.sciam.com.

"DAML+OIL Specification", Mar. 2001, http://www.daml.org/2001/03/daml+oil.

Joseph B. Kopena, William C. Regli, "DAMLJessKB: A tool for reasoning with the Semantic Web". IEEE Intelligent Systems, 2003, pp. 74-77, vol. 18(3).

Dan Connolly, Frank Van Harmelen, Ian Horrocks, Deborah L. McGuinness, Peter F. Patel-Schneider, Lynn Andrea Stein, "DAML+OIL (Mar. 2001) Reference Description," W3C Note, Dec. 18, 2001. http://www.w3.org/tr/daml+oil+reference.

Ernets-Friedman Hill, "Jess, the Rule Engine for the Java Platform", Java Expert System Shell, http://herzberg.ca.sandia.gov/jess/, 2005.

"OWL Web Ontology Language Reference", WC3 Semantic Web, Dec. 9, 2003, http://www.daml.org/2002/06/webont/owl-ref-proposed.html.

Volker Haarslev, Ralf Moller, "Description of the RACER System and its Applications", In Proceedings of the International Workshop in Description Logics 2001 (DL2001), Aug. 2001, Stanford, http://citeseer.ist.psu.edu/article/haarslev01description.html.

James Hendler, Tim Berners-Lee, Eric Miller "Integrating Applications on the Semantic Web," Journal of the Institute of Electrical Engineers of Japan, Oct. 2002, pp. 676-680, vol. 122(10).

Rajnish Kumar, Vahe Poladian, Ira Greenberg, Alan Messer, Dejan Milojicic, "User-Centric Appliance Aggregation", HP Labs Technical Report HPL-2002-277, Oct. 2002. pp. 1-16.

Dejan Milojicic, Philippe Bernadat, Rick Corben, Ira Greenberg, Rajnish Kumar, Alan Messer, Dan Muntz, Eamonn O'Brien Strain, Vahe Poladian, Jim Rowson, "Appliance Aggregation Architecture ($A^3$)", HP Labs Technical report HPL-2002-277, Jul. 3, 2003. pp. 1-10.

Dipanjan Chakraborty, Filip Perich, Sasikanth Avancha, Anupam Joshi, "DReggie: Semantic Service Discovery for M-Commerce Applications", Workshop on Reliable and Secure Applications in Mobile Environment, In Conjunction with 20th Symposium on Reliable Distributed Systems (SRDS), Oct. 12, 2001, http://ebiquity.umbc.edu/paper/html/id/49/.

Sasikanth Avancha, Anupam Joshi, Timothy Finin, "Enhanced Service Discovery in Bluetooth", IEEE Computer, Jun. 28, 2002. pp. 96-99, vol. 35, University of Maryland, Baltimore County.

Javier Gonzalez-Castillo, David Trastour, Claudio Bartolini: "Description Logics for Matchmaking of Services", Hewlett- Packard Company, 2001, pp. 1-13. Bristol, United Kingdom. http://www.hpl.hp.com/techreports/2001/HPL-2001-265.pdf.
Ryusuke Masuoka, Yannis Labrou, "Task Computing—Semantic-web enabled, user-driven, interactive environments", Fujitsu Laboratories of America, Inc., College Park, Maryland. http://www.flacp.fujitsulabs.com/.
Katia Sycara, Seth Widoff, Matthias Klusch, Jianguo Lu, "Larks: Dynamic Matchmaking among Heterogeneous Software Agents in Cyberspace", Autonomous Agents and Multi-Agent Systems, 2002, pp. 173-203, Kluwer Academic Publishers. http://www-2.cs.cmu.edu/~softagents/papers/LARKS.pdf.
Massimo Paolucci, Takahiro Kawamura, Terry R. Payne, Katia Sycara, "Semantic Matching of Web Services Capabilities", In First Int. Semantic Web. Conf. 2002, http://citeseer.ist.psu.edu/paolucci02semantic.html.
U.S. Final Office Action for U.S. Appl. No. 10/947,774, mailed Aug. 31, 2009.
U.S. Final Office Action for U.S. Appl. No. 10/948,399, mailed Oct. 27, 2009.
Lashina et al., "The context aware personal remote control: a case study on context awareness", published 2003.
Chinese Third Office Action dated Aug. 4, 2010 issued for Chinese Patent Application No. 200510132458.3, filed Aug. 5, 2009, pp. 1-12, Beijing, China (English-language translation included).
Office Action in Japanese Application No. 2006-001541, mailed Jan. 4, 2011.
Office Action for Korean Application Sep. 5, 2006-069705515, dated Jan. 22, 2007.
Office Action (and English translation) in corresponding Korean Application No. 10-2005-0112970, mailed Nov. 10, 2006.
Decision of Grant in corresponding Korean Application No. 10-2005-0112970, mailed Jul. 16, 2007.
Huh et al., "A Policy-based Context Management Architecture for Ubiquitous Computing Environment," Nov. 3, 2004.
Office Action in corresponding Japanese Application No. 2005-274134, mailed Feb. 1, 2011.
Notice of Allowance in U.S. Appl. No. 10/947,774, mailed Apr. 11, 2011.
Notice of Allowance in U.S. Appl. No. 10/948,399, mailed Jun. 3, 2011.
Notice of Allowance in U.S. Appl. No. 11/200,546, mailed Mar. 8, 2011.
Search Opinion from EP Publication No. 1679828, dated Apr. 6, 2006.
Search Report from EP Publication No. 1679828, dated Apr. 6, 2006.
Search Report from EP Publication No. 1640838, dated Nov. 16, 2005.
Exam Report from EP Publication No. 1640838, dated May 5, 2006.
Search Report from EP Publication No. 1640839, dated Nov. 24, 2005.
Exam Report from EP Publication No. 1640839, dated May 5, 2006.
Final Office Action dated Jul. 20, 2011 from U.S. Appl. No. 11/200,547.
Notice of Allowance dated Aug. 1, 2011 from U.S. Appl. No. 11/200,546.
Office Action for Chinese Application 200610000398.4, dated Dec. 21, 2007.
Office Action dated Jan. 8, 2010 from Chinese Application No. 2005101049497.
Reexamination dated Oct. 9, 2010 from Chinese Application No. 2005101049497.
Office Action dated Aug. 15, 2008 from Chinese Application No. 2005101049497.
Office Action dated Dec. 28, 2007 from Chinese Application No. 2005101049497.
Office Action dated Jun. 15, 2007 from Chinese Application No. 2005101049497.
Notice of Allowance dated Apr. 27, 2007 from Korean Application No. 9-5-2007-023065177.
Office Action dated Nov. 7, 2006 from Korean Application No. 9-5-2006-065657876.
Office Action dated Nov. 21, 2008 from Chinese Application No. 2005101324583.
Office Action dated May 22, 2009 from Chinese Application No. 2005101324583.
Office Action dated Oct. 20, 2006 from European Application No. 05257951.3.
Search Report dated Apr. 13, 2006 from European Application No. 05257951.3.
Office Action dated Nov. 22, 2006 from Korean Application No. 9-5-2006-069705515.
Notice of Allowance dated Apr. 27, 2007 from Korean Application No. 9-5-2007-023304342.
Notice of Allowance dated Sep. 29, 2011 from U.S. Appl. No. 10/948,399.
Notice of Allowance dated Oct. 18, 2011 from U.S. Appl. No. 10/947,774.
Almeida et al., "Abstract Interactions and Interaction Refinement in Model-Driven Design," Proceedings of the 2005 Ninth IEEE International EDOC Enterprise Computing Conference, Sep. 19-23, 2005, 14 pages.
Office Action in Japanese Application No. 2005-274135, mailed Feb. 1, 2011.
Office Action dated Sep. 28, 2007 from Chinese Application No. 2005101049529, with English Translation.
Office Action dated Jun. 15, 2007 from Chinese Application No. 200510104950X, with English Translation.
Office Action dated Oct. 26, 2006 from Korean Application No. 10-2005-0084649.
Decision to Grant dated May 29, 2007 from Korean Application No. 10-2005-0084649.
Lee et al, "Coupling structural and functional models for interaction design," Interacting With Computers, Butterworth-Heinemann, GB, vol. 16, No. 1, Feb. 2004, pp. 133-161, XP004908657 ISSN: 0953-5438.
Office Action dated Oct. 26, 2006 from Korean Application No. 10-2005-0083589.
Decision to Grant dated May 29, 2007 from Korean Application No. 10-2005-0083589.
Notice of Allowance dated Feb. 23, 2012 from U.S. Appl. No. 10/947,774.
Chinese Office Action dated Jun. 2, 2011 from Chinese Application No. 200510132458.3.
Office Action in Japanese Application No. 2006-001541, mailed Aug. 23, 2011.
Chinese Office Action dated Nov. 2, 2011 from Chinese Application No. 200510132458.3.
Notification of Granting of Patent Right Invention from Chinese Application No. 200510104949.7.
European Search Report from EP05255590 mailed Mar. 1, 2012.
U.S. Non-Final Office Action mailed Nov. 30, 2012 for U.S. Appl. No. 11/200,547.

* cited by examiner

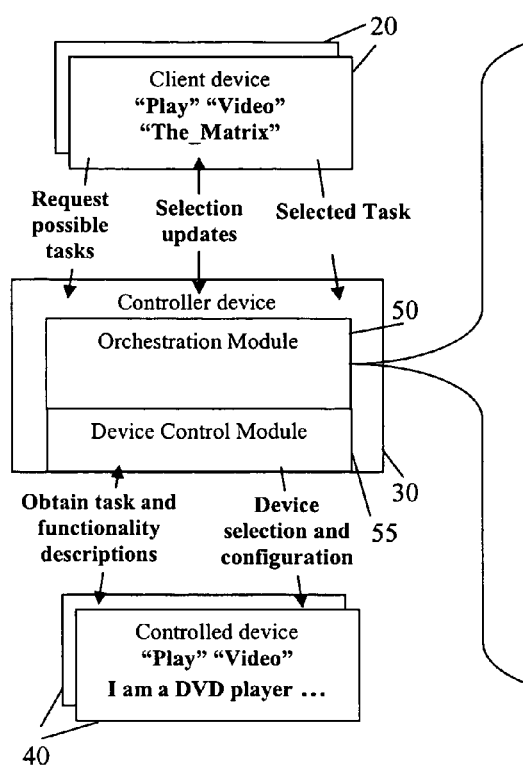
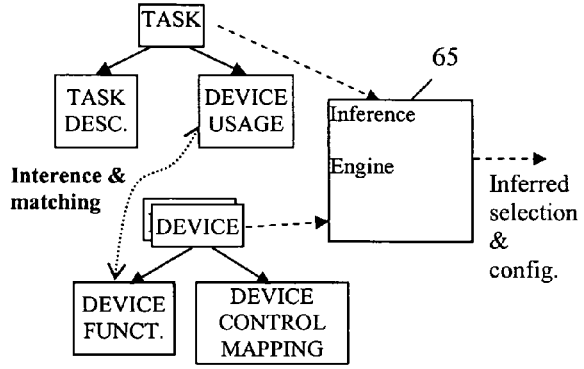
FIG. 1B
FIG. 1A

METHOD AND SYSTEM FOR DESCRIBING CONSUMER ELECTRONICS USING SEPARATE TASK AND DEVICE DESCRIPTIONS

FIELD OF THE INVENTION

The present invention relates in general to providing user interfaces for user control of devices, and in particular to presenting and representing user tasks for a set of consumer electronic (CE) devices.

BACKGROUND OF THE INVENTION

Typical user interfaces for user control of devices such as CE devices (e.g., TV, VCR, DVD player, CD player, etc.) are such that user tasks are not represented in the devices. Instead, a set of device functions are presented to the user and the user selects combinations of these device functions to perform a task. For example, to watch a video tape requires the user to select the input (e.g., tape), rewind the tape and press play on a VCR. As a result, the user cannot simply specify that he/she wishes to 'watch' 'video tape' to automate the above operations. Users cannot express desired tasks to be performed (e.g., 'watch' 'video tape'), rather users must directly control devices to perform desired functions (e.g., selecting the input, rewinding the tape and pressing play on a VCR).

This is similar to conventional software architecture wherein tasks map into the idea of an application. For example, if a user wants to write a letter, the user runs a word processor that has the appropriate functionality. However, apart from a well known functionality mapping to a well-known name, this expresses little to the user. Another alternative has been to present the user with a set of options in the form of a menu. Several systems allow well-known tasks to be listed in menu options (e.g., spell-check document or instant record on a VCR). However, such systems only provide device functions to the user.

Yet another alternative has been to allow a user to express the task graphically (e.g., using lines to connect together a set of depicted devices to perform a desired task). The problem with this approach is that it does not mask the complexity of using the devices from the user. It simply graphically represents the function selections to the user and asks the user to specify the connections necessary to perform a task.

Further, conventionally, consumer electronics are described using interface descriptions such as language APIs. Middleware such as UPNP, OSGi, Jini, etc. have standardized the use of such computer procedural interfaces. However, these interfaces do not describe the device to any level of detail that can be meaningfully used by another computer/device, except for calling the defined interfaces. Other approaches have focused on describing capabilities and preferences in more detail, such as CC/PP, wherein sets of attributes can be expressed for computing devices that represent capabilities and preferences. Further, approaches in the area of the semantic web, have moved towards more elaborate description capabilities, such as the work embodied by DAML and RDF. However, such approaches only describe a core for describing entities rather than a particular approach. Using semantic web and XML technologies as a core, past work such as User-Centric Appliance Aggregation at HPL have attempted to describe consumer electronics only using device descriptions that associate a task with every device. For example, a DVD 'plays DVDs' and a TV 'displays video'. The problem with these approaches is that they do not adequately describe devices and their interactions, because there are many user tasks that have more details than can be captured by a single device. For example, playing a DVD may require the lights to be dimmed as well.

There is, therefore, a need for a method of device interaction that is described in a flexible description rather than as a controller program acting as a black box. There is also a need for such a method to allow device interactions that more closely match the structure of users' perception of home device usage. There is also a need for such a method to provide task descriptions that allows interactions not to be centered on one single device. (i.e., no direct device to task mapping). There is also a need for such a method to provide a description of user tasks to allow interoperable description and interchange of descriptions.

BRIEF SUMMARY OF THE INVENTION

The present invention addresses the above needs. In one embodiment the present invention provides a task orchestration system that implements a method of representing user tasks to be performed by one or more of a plurality of electronic devices in a network. Each device includes therein a function description specifying the functions that the device can perform. Device functionality is expressed as a device description specifying a function that the device can perform. The function descriptions are obtained from one or more of the devices. Further, task descriptions that describe the user task and the functions needed to perform certain tasks, are also obtained. Then, the obtained function descriptions and task descriptions are used to generate task suggestions for the user. Each task suggestion abstractly represents a user task as a pseudo-sentence, and is obtained from a task description and that may use one or more of the obtained device descriptions. The task suggestions are displayed on a display for the user to select from, wherein the requested task represented by a selected task suggestion is to be performed by one or more of the devices. As such, the task suggestions masks device functions from the user of the system.

In one embodiment, task suggestions are represented to the user using a pseudo language structure organized as a set of terms that have types, to describe user tasks as abstractions of task descriptions and device function descriptions. A user interface device is utilized to displays the task suggestions on a display for the user to select from, such that they can be selected to perform the tasks by one or more of the devices under the control of a task orchestration (automation) module.

In selecting among task suggestions, a user is allowed to select pseudo-sentence elements/terms such that the user selected task suggestions can be performed by the devices under control of the task orchestration module in the system. The task orchestration module can be a logical component of the system.

In one example, a user task description comprises task external description, task properties, task functionalities and task actions. The task external description outlines task suggestions (i.e., pseudo-sentences) for interaction with a user. The task properties express information about the user task. The task functionalities express functionality required to perform the user task. And, the task action describe the sequencing and combinations of the devices that fulfill the required functionalities. The device description comprises device functionality description and device grounding, wherein, the functionality description outlines functionality of a device, and the device grounding describes device control based on the functionality description.

As such, in one embodiment, the task orchestration module comprises a task-driven controller that obtains device function descriptions from one or more of the devices, obtains task descriptions that describe device functionalities required by certain tasks, generates task suggestions from the task descriptions and device descriptions, and once a task suggestion is selected, performs the selected task suggestion based on task descriptions that use functionalities described in the obtained device function descriptions.

These and other features, aspects and advantages of the present invention will become understood with reference to the following description, appended claims and accompanying figures.

BRIEF DESCRIPTION OF THE DRAWINGS

These and other features, aspects and advantages of the present invention will become understood with reference to the following description, appended claims and accompanying figures where:

FIG. 1A shows a block diagram of an example architecture of an embodiment of a task orchestration system according to the present invention;

FIG. 1B shows a flow diagram of an example task orchestration process according to the system of FIG. 1A;

DETAILED DESCRIPTION OF THE INVENTION

Figure 2:
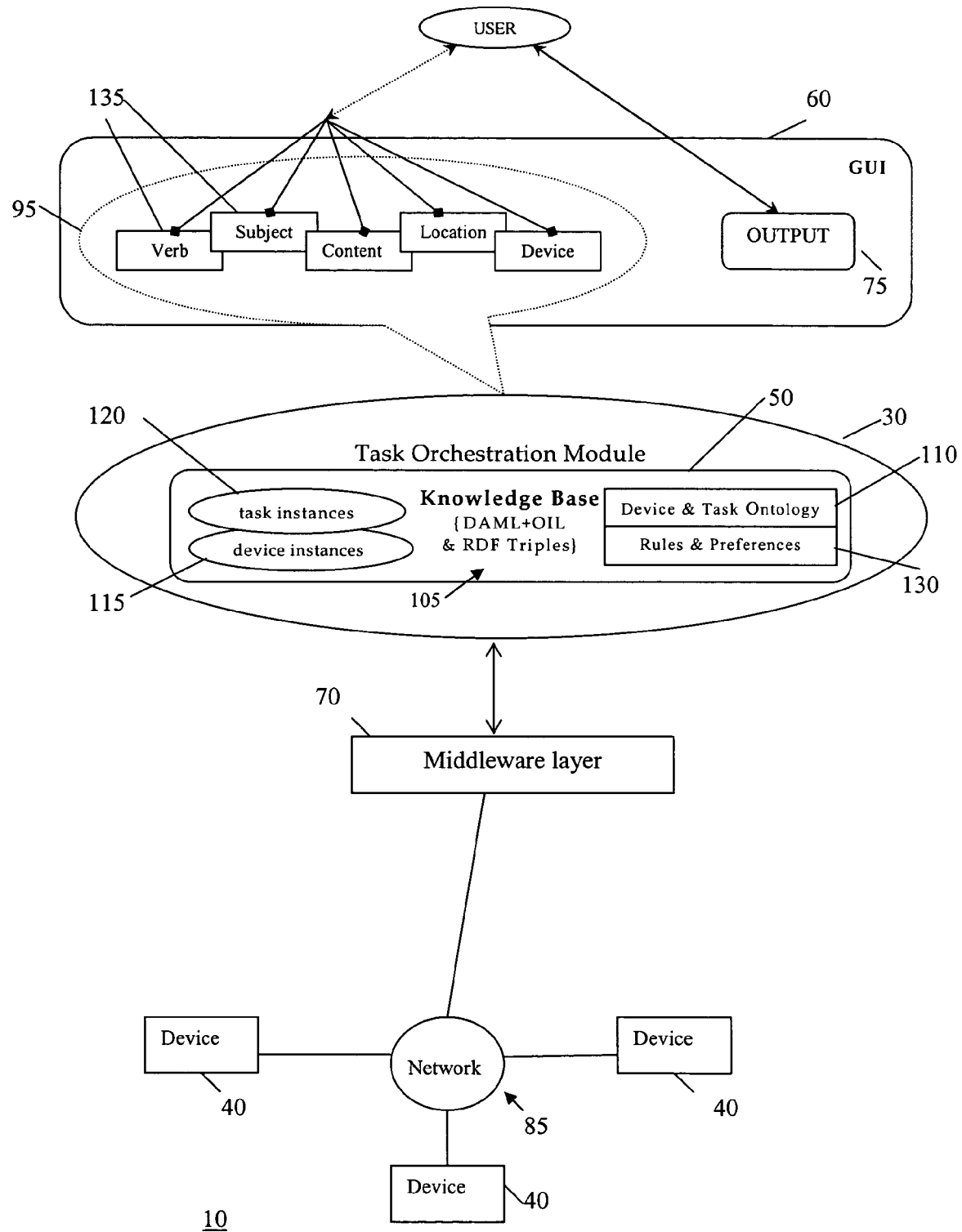
FIG. 2 shows a block diagram of an example architecture of another embodiment of a task orchestration system, including a task orchestration module, according to the present invention.

In one embodiment, the present invention provides a system for orchestrating user tasks over a diverse set of devices, such as consumer electronic devices in a home wherein the devices are interconnected in a network. Orchestrating user tasks involves automating the process of selecting the devices to use to perform a task. In one example, this includes obtaining device function descriptions and task descriptions, generating task suggestions based on the obtained device function descriptions and task descriptions, ranking the task suggestions, allowing a user to select among the tasks suggestions, and orchestrating (automating) the devices to perform the selected/requested task suggestions. For example, as noted task suggestions can be described as pseudo-sentences comprising a set of elements/terms that modify one another.

The present invention allows describing user tasks in an incremental and flexible way using pseudo-sentences which are also human-readable. As such it does not define how the description is mapping into the operation of devices, instead is focuses on how to express task operations in a way that can be interpreted by the user. The pseudo-sentences provide an abstraction layer away from the underlying devices. Tasks can be described using the pseudo-sentences in a loosely similar approach as graffiti handwriting recognition symbols are close to actual roman letters (e.g., graffiti of user tasks compared to natural language and full handwriting recognition). In one implementation, this allows a compact program to determine user tasks without complex natural language processing.

Task orchestration operates as a high-level, task-oriented, remote control for the devices and minimizes the selections and settings for the user. As such, combinations of several technologies are utilized to provide an orchestration system suitable for automating the orchestration of user tasks.

Referring to the example architecture in FIGS. 1A-B, a task orchestration system 10 according to the present invention allows user tasks to be automated into a set of orchestrated device actions with minimal input from the user. In one version, the task orchestration system 10 comprises three types of logical devices: (1) client devices 20 which include devices that show a user interface, (2) controller devices 30 which include devices that control other devices, and (3) controlled devices 40 which include devices that are controlled by controllers.

Each logical device can have a particular functionality to enable task orchestration according to the present invention. Specifically, controlled devices 40 include enhanced descriptions of their functionality using a language such as e.g. a semantic mark-up language (this does not describe their interface, but instead abstractly describes their functionality). In addition, to descriptions of device functionality, a device may include one or more user task descriptions. The task descriptions can specify tasks that only use their functionality, use their functionality and potential functionality of other devices, or simply are tasks for other devices.

Controller devices 30, comprising task orchestration (TO) modules 50, include functionality to orchestrate devices to perform user-selected task suggestions (i.e., task requests). In addition to control access software, a controller 30 includes an inference system (e.g., an expert system, rule system, etc.) in the task orchestration module 50, that is capable of inferring a set of actions and devices for performing a task request. The controller 30 takes task and device functionality descriptions and uses that information to infer: (1) what tasks are valid in the system, given the current devices, their functionality, and the described tasks, and (2) what device combinations are potentially usable to fulfill a requested task.

Client devices 20 include the functionality to request and display task suggestions to the user. As such, they include a user interface that is coupled with the task orchestration module 50 of the controller 30 to show tasks to the user. This coupling enables the user interface (e.g., GUI) to only display task suggestions that are possible given the current devices 40, tasks and functionality. Further, if part of a task suggestion has been made (i.e., part of a task request has been specified), the user interface may use the controller 30 to further reduce applicable user options. Using this functionality, the client device 20 is able to list available tasks and options as task suggestions using pseudo sentences. A task suggestion is selected by the user, and a request to execute the selected task suggestion is processed by the controller 30 to perform the selected/requested task. This allows the controller 30 to determine in a simplified fashion what user task is desired and match it to task descriptions and eventually to device selection and configuration for fulfilling the task. User preferences, such as which room to play a video in, are specified as part of a task suggestion pseudo sentence as modifiers (e.g., pseudo sentence Play Video 'in the bedroom' or Play Video 'using headphones'). These parts of the search space (i.e., available parts of the pseudo sentences) for selecting the task suggestions are explained further below by describing consumer electronics using separate task and device descriptions.

FIG. 2 illustrates an example functional architecture of the task orchestration system 10 according to the present invention, including a user interface (GUI) module 60 and a controller 30 that includes a task orchestration module 50 as a top layer over underlying client devices 40. A middleware layer/module 70 between the controller 30 and the client devices 40. The module 70 provides middle layer functions which enable control of the devices (e.g., provides APIs to control the devices). Operation of the module 70 is beyond the scope of the present invention, and therefore, not described in detail herein.

Through the user interface 60, the task orchestration module 50 allows presenting and representing task suggestions that can be performed by a set of consumer electronic devices 40. As such, the task orchestration module 50 masks how those task suggestions are mapped to the devices 40, and only represents tasks suggestions to a user. A way of describing tasks as tasks suggestions in an incremental and flexible way is provided that is also human-readable. Such a method does not focus the user on how a task description 95 is mapped into the operation of devices 40, and instead focuses on expressing task operations in a way that can be interpreted by the user (e.g., task suggestions as termed pseudo-sentences).

Figure 3:
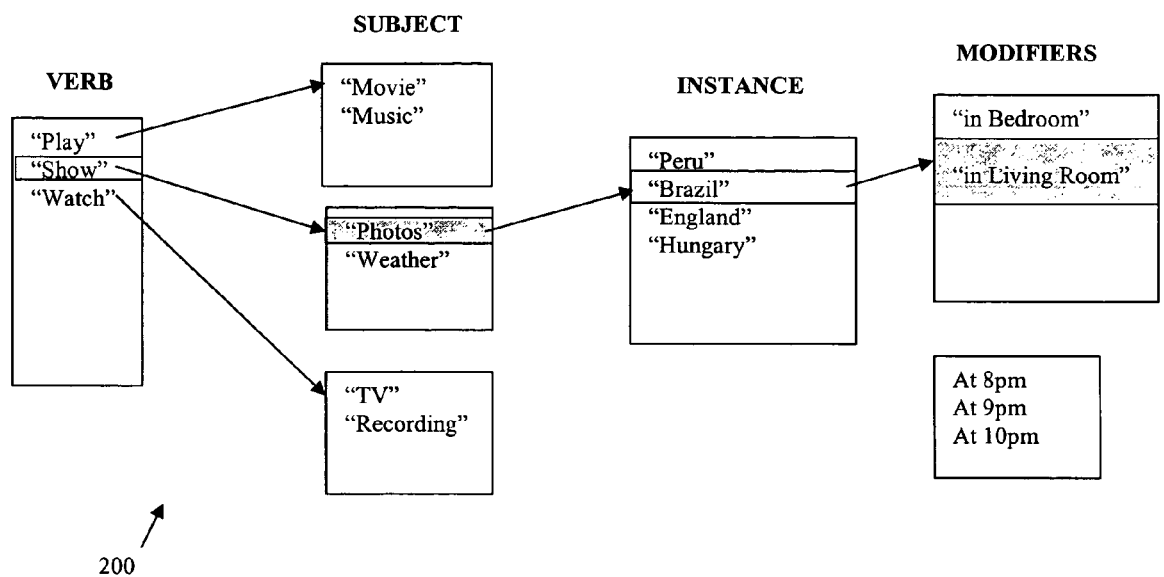
FIG. 3 shows an example task suggestion using a pseudo language in the system of FIG. 2.

Now also referring to FIG. 3, in one example, a task suggestion can be described in a simplified language structure 200 that represents a pseudo sentence. For simplicity of description herein, the example structure is organized as a set of terms that modify one another, wherein in this example a standardized set of 'verbs' defining actions are used as the root of a hierarchical language tree 200. For example, "play", "show", "watch", "adjust", "water", etc. are a set of 'verbs', and following each 'verb' is a 'subject', such as "photos", "lawn", "movie", etc. The 'subjects' modify the 'verbs' by reducing the scope of the actions defined by the 'verbs'.

Following the 'subjects', there are combinations of 'modifiers' such as an instance that further reduces the scope to a particular action. For example, "Play" "Movie" "The Matrix" adds "The Matrix" as a particular instance. Other 'modifiers' such as "in the den" or "at 8 pm" can be specified to control the task. Yet, other modifiers may specify the media on which the movie "The Matrix" resides. Note that this structure specifies tasks, not device actions. Device actions such as changing volume or channels are not tasks herein, instead they are actions on an existing task (e.g., changing the volume while "watching" "TV"). Word combinations in this structure 200 are filled not by a fixed set of terms for a particular context (for example the home), rather by a standardized descriptions of tasks located in devices 40. These devices are then queried to produce a set of terms for each level and modifiers that are possible based on the devices currently connected or reachable in the system. This approach makes it much easier to specify a user task, since a large irrelevant word base would make it difficult to determine the correct pseudo-sentence.

Figure 4:
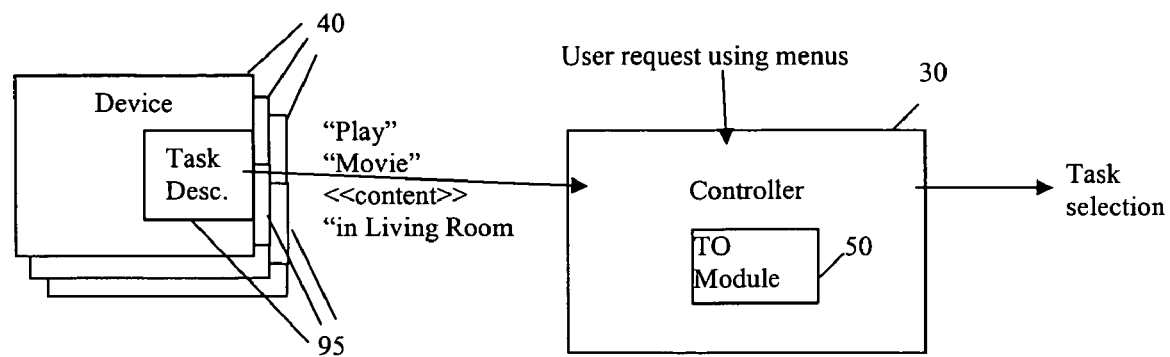
FIG. 4 shows an example of obtaining device function descriptions from the devices to generate task suggestions in the system of FIG. 2.

Now also referring to the example diagram in FIG. 4, the devices 40 are queried for a set of terms for each level (i.e., position in pseudo-sentence), and modifiers that are possible based on the devices currently connected or reachable in a home network 85 (FIG. 2), as task descriptions 95. This approach simplifies specifying a task suggestion because otherwise a large irrelevant word base would make it difficult to determine the correct pseudo sentence.

An enhancement to this embodiment of the present invention is to determine only the set of terms or modifiers that are possible based on the current selection of other terms or modifiers. For example, if "play" and "on CD player" are selected, then even though "play" "video" is a possible task, it does not fit a device task description in the system because video cannot be played on the CD player. Instead, only "music" is presented to the user, if that is the only option based on the devices 40 present.

Another enhancement to this embodiment of the present invention is to allow the task to be partially specified (e.g., "Play" "Music" "A Song Name"). If multiple tasks match, then the task may be instantiated by determining an option for the user. This can be by random selection, by learning based on past requests, or by more complex approaches. This allows users to reduce their decision making and user interface options when they know that few options exist, or the task orchestration module 50 can determine a suitable selection for the users based on the user input so far. The task orchestration module 50 can also fill-in available options as it determines them based on the available devices and resources. For example, if only one music device exists (a CD player), then room modifiers and device selections are removed at run-time as part of any underlying machine automation.

Therefore, the present invention allows the users to specify tasks, not device operations; allows applications or devices to specify what functions they perform; allows a user interface to search for only tasks that are possible to be expressed/executed rather than all tasks that could exist; provides a standardized vocabulary that allows users to quickly express tasks; and allows a compact program to determine user tasks without complex natural language processing.

As noted, in another aspect the present invention provides a method of describing consumer electronic devices using separate task descriptions and device function descriptions. As such, device interactions are expressed using both device functionality descriptions and abstract device interactions. In this way, device descriptions (i.e., device functionality) and user tasks (i.e., device usage) are logically separated into a set of rich descriptions. Using those descriptions, it becomes possible to describe a set of consumer electronics (such as those in the home) and a set of possible ways that they may interact. Based on the complexity of the task descriptions and the device descriptions, complex sequential, parallel and coordinated interactions can be expressed to orchestrate functionality of home devices into performing user tasks. This provides: Device interaction that is described in a flexible description rather than as a controller program acting as a black box; device interactions that more closely match the structure of users' perception of home device usage; task descriptions that allow interactions not to be centered on one single device. (i.e. no direct device to task mapping); and a description of user tasks as task suggestions that allows interoperable description and interchange of descriptions.

Figure 5:
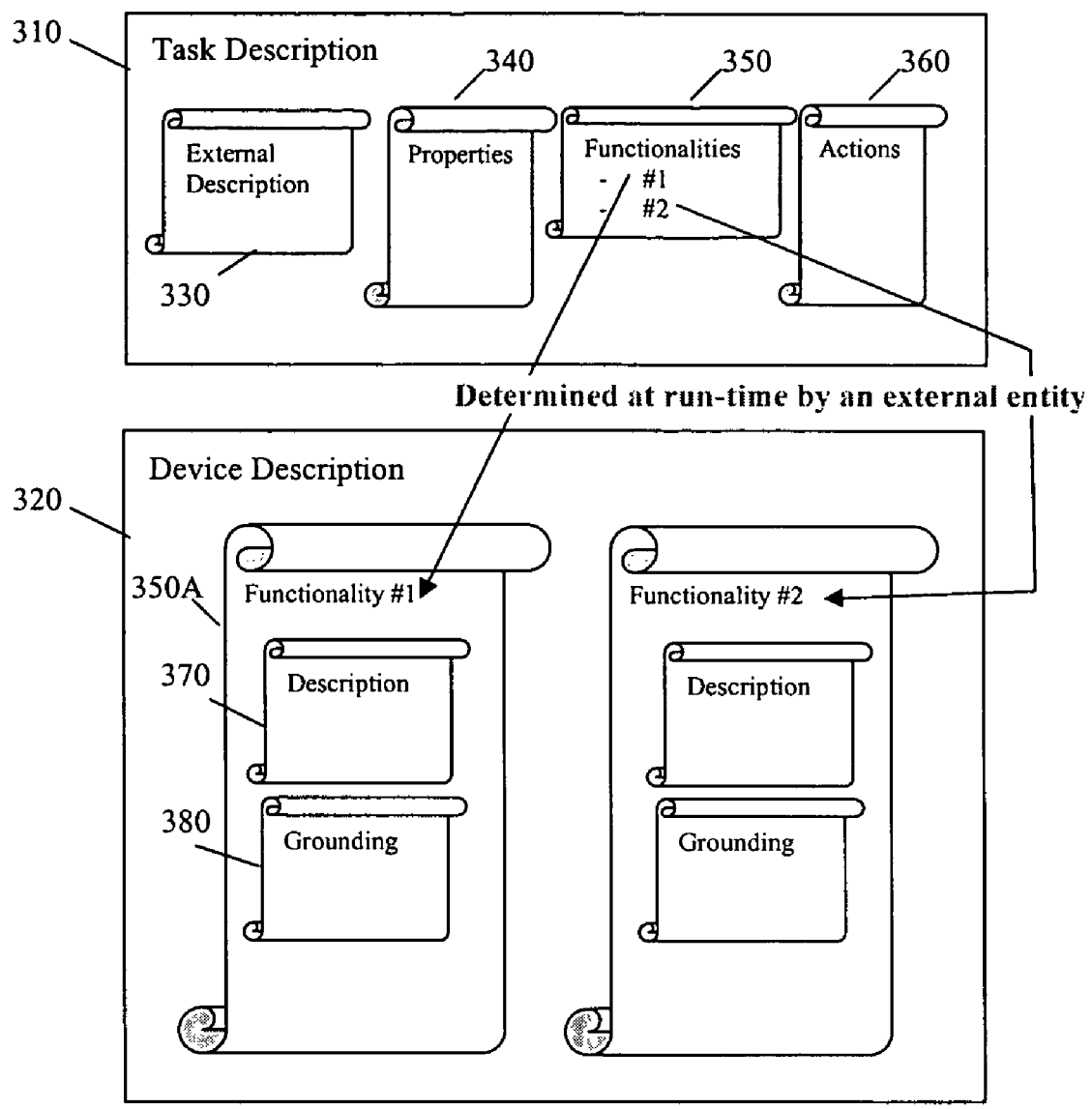
FIG. 5 shows examples of logically separate task descriptions and device descriptions according to the present invention.

Referring to FIG. 5, in one example, the description 300 of consumer electronics 40 is provided as two logical descriptions: task description 310 (i.e., user tasks) and device description 320 (i.e., device functionality). These descriptions 310, 320 are related in such as way that a task suggestion can allow a controller 30 to understand what possible devices 40 in the home network 85 can be used to achieve a task suggestion based on a task description 310. This type of description 310 has many uses, but principally it allows tasks to be decoupled from the devices 40 in the home network 85. It also allows tasks to be decoupled from black box controller style applications that programmatically perform tasks in predetermined and predefined orders for well-known existing devices.

As shown in FIG. 5, a task description 310 includes four parts: (1) task external description 330, (2) task properties 340, (3) task functionalities 350 and (4) task actions 360. The task external description 330 outlines the pseudo-sentences (note that in this example the task description 95 in FIG. 2 and the task description 330 in FIG. 5 are the same). Task properties express 340 information useful about the task (e.g., that it can optionally dim a light when a DVD is played, or that certain users are allowed to use this task). Task functionalities express 350 functionality required by the task to achieve its goals. This functionality is described using a shared terminology with device descriptions 320 and describes the abstract functionality of a device 40. For example, a DVD player may be an "AVSource". This functionality is described as a hierarchy of functionalities. Further, a DVD player may be described as an AV source, if it has some form of multi-function operation. Or, simply "DVDAVSource" which is a sub-class of "AVSource" that describes DVD players. Lastly, task actions 360 describe the sequencing and combinations of the devices that fulfill the functionalities listed.

Further, device descriptions 320 have a similar structure to task descriptions and share the functionality description. Device descriptions 320 may include functionality 350A, wherein the task functionality 350 in the task description 310 maps to functionality 350A in the device description 320. The functionality 350A can include a functionality description 370, a device grounding 380 and device attributes (e.g., screen size, features, etc.). The functionality description 370 outlines the functionality of a device 40. For example, a CD player is a AudioSink, while a transcode would have functionality as a MPEGAudioSink and a MPEGAudioSource. The device grounding 380 describes how to control the device 40 based on the functionality description 380. For example, it may include URLs to call to change the volume level, setup device connections, etc. Alternatively, it may have a grounding to control a UPNP device by expressing UPNP interactions necessary to control the device. As those skilled in the art will recognize, other device control protocols may also be utilized.

At run-time, the task descriptions 310 and the device descriptions 320 are read by the task orchestration module 50 and analyzed to determine if a set of devices 40 exist that matches the task functionalities 350. If it does, the task orchestration module 50 takes the device functionalities 350 matching the task as candidate devices for the tasks. The task orchestration module 50 then recurses through the available devices 40 to determine a combination of devices 40 that fulfill the functionalities 350 of the task. Sets of matching task/device combinations are returned from this search and presented to the user as output solutions 75 on the GUI 60 (FIG. 2). The user selects a pseudo-sentence he prefers, which is mapped to a task/device combination and instantiates the task by using the task actions which in turn require device actions that use the device grounding 380 in the device description 320 to fulfill the task.

Because device descriptions 320 are only logically separate from task descriptions 310 in the description 300, nothing prevents a device 40 from describing its functionality as a task description in addition to participating in larger tasks, and the descriptions can be physically combined. An alternative implementation is the building of the device descriptions 320 and task descriptions 310 using semantic web technologies, so to allow a shared semantic ontology (language) to be used to richly describe all aspects of devices and tasks in a way that its semantics are machine readable. While the above description is in the context of home consumer electronics, as those skilled in the art recognized, the present invention can be used in other applications such as e.g., in mobile devices, desktop computing, enterprise computing, etc.

As such, the module 50 combines task descriptions and device descriptions to determine whether a device can be used for a particular task. To perform a user task, the module 50 obtains information on the combination of task and device descriptions to determine the grounding information for the device, wherein a task description includes a sequence of actions scripts that the module 50 uses to orchestrate the device actions. Further, the module 50 combines grounding information from multiple device descriptions with a task description script to generate a specific script for controlling the devices for a user task. Device grounding information is specified on a functionality basis from the device descriptions. Further, device grounding information specifies interactions and parameter settings to determine the control of a device. The device grounding can be specified in the form of a uniform resource identifier (URI) to describe the action and parameters to use. Further, the device grounding information can include multiple grounding information sections that are combined to fulfill the required functionality. In addition, the device description can include multiple grounding information sections that map to different protocols used by a control or device software.

An example implementation of the task orchestration system 10 according to an embodiment of the present invention using the above methods to enhance the functionality and intelligence of the underlying devices 40, is now described. As shown in FIG. 2, the task orchestration system 10 implements techniques for the user to request a task suggestion to the system 10 and techniques to interpret and process the task suggestion. In this embodiment, several Semantic Web based tools and techniques were adapted to build an efficient system, including developing ontologies for entities (e.g., devices) in a semantically rich mark-up language. The ontologies are framed to represent home devices 40 and user task requests 95, and are described in detail further below.

The task orchestration module 50 provides task suggestions to the user, and receives requests from the user to orchestrate the execution of task suggestions selected by the user. The task orchestration module 50 uses an inference engine 65 (FIG. 1B) as a top layer, in conjunction with the user interface 60 (FIG. 2), to process a selected task suggestion 95 by parsing it, discovering the appropriate devices 40 that can execute the selected task suggestion and passing this information onto the bottom layers (e.g., module 70) for execution. In one example, a suitable mark-up language along with the inference engine 65, are used to reason over the content expressed in that language, whereby the entities communicate with, and understand, each other. In one version, semantic technologies are used to describe device functionality and tasks to facilitate functionality-centric coupling of devices.

For example, typically the following types of devices 40 are in the home network 85:

TV—show audio/video
DVD—play audio/video, show photos
PC—show audio/video, show photos, play games, A V source
Receiver—connect source to sink, play audio, play radio
Refrigerator—surf web, play audio/video, control
Lights—control
Phones—play audio, call user, user database
PVR—record audio/video, pause, play, store photos, show photos
Cameras—record audio/video, play audio/video, stream audio/video etc.

Example tasks possible in that home network 85 can include:

"Water" "the garden"

"Play" "Movie" "The Matrix" "in Surround Sound"
"Show" "Photos" "Brazil"
"Synchronize" "MP3 Player"
"Dim" "lights"
"Play" "My music" "Living room"

The above examples (scenarios) use e.g. a pseudo sentence language to express task suggestion, whereas e.g. a semantic language is used to describe the devices and functionalities, and an inference engine is used to reason over that knowledge and execute a task request. In one example, the language chosen to express ontologies/rules provides: a semantic level of agreement, a high degree of flexibility and expressiveness, support for type and subsumption, support for datatypes, and expression of restrictions and constraints. A Knowledge-base 105 is included in the task orchestration module 50 (FIG. 2).

In another example, Semantic Web technologies can be utilized in the task orchestration module 50. The Semantic Web is an extension of the current web in which information is given well-defined meaning, better enabling computers and people to work in cooperation. A Mark-up language designed for the Semantic Web provides common understanding between the various entities. Example Semantic Web technologies include DAML+OIL, DAML-S, OWL, etc., which were developed for the Semantic Web. In one example of the task orchestration module 50, Device and Task Ontologies 110 are framed using DAML+OIL and are loaded in the Knowledge Base 105 therein. A variety of attributes and functionalities of devices 40 are identified and an ontology is framed that also captures the relationships among the attributes. Further, device instances 115 in DAML+OIL are framed based on the ontology, wherein an instance is essentially a semantic description of the device in terms of its interfaces and functionalities. As shown by Task Orchestration flow in FIG. 1B, the user-selected task suggestion is divided into one or more tasks as required and mapped to the functionalities of tasks that can be performed by the available devices. The mapping is made possible by inferencing (reasoning) over the information expressed in the ontology and executing additional rules about the device/user's state/preferences.

Referring now to the examples in FIGS. 2 and 4, the task orchestration module 50 resides in the controller 30 that interacts with the module which provides interfaces for the task orchestration module 50 to obtain the device descriptions whenever needed. In one embodiment, DAML+OIL task instances 120 provided by the existing devices are asserted into the Knowledge Base 105, and pre-defined user preferences 130 written as Jess rules and/or DAML+OIL are also loaded into the Knowledge Base 105. Further, the device preferences with respect to the task requested and attribute preferences with respect to the functionalities needed for the task are incorporated. All the possible 'verbs' (e.g., "Play") and 'subjects' (e.g., "Movie") are retrieved from the Knowledge Base 105 and are displayed on the GUI 60.

As such, the user's task request is obtained through the GUI 60 as a set of fields 135 (e.g., FIG. 2) and provided as input to the Knowledge Base 105 of the task orchestration module 50. In one example, the input obtained from the user includes all optional fields. In another example, the input obtained from the user includes:

a) mandatory fields: a verb, a subject and content, location, end-device b) optional fields: attributes (e.g., surround sound, wide screen, etc.)

In this example, after the user chooses a 'verb' and a 'subject', the task orchestration module 50 communicates with a protocol stack in the module 70 to obtain all the content available that is relevant in the context of the 'subject'.

Upon obtaining a complete task suggestion selected by the user, the task orchestration module 50 parses the task suggestion and corresponding task description 95 and computes all possible combinations of that devices 40 that can service the request as solutions. Then, the task orchestration module 50 applies the preferences and ranks the solutions before sending for display as output 75 for the user via the GUI 60.

As noted, the task orchestration module 50 interacts with the user via the GUI 60, and interacts with the inference engine 65 (FIG. 1B), and a rule engine 130 (FIG. 2). The task orchestration module 50 further includes the Knowledge Base 105 that serves to store ontologies 110 in the form of facts and applies rules 130 over that data.

Figure 6:
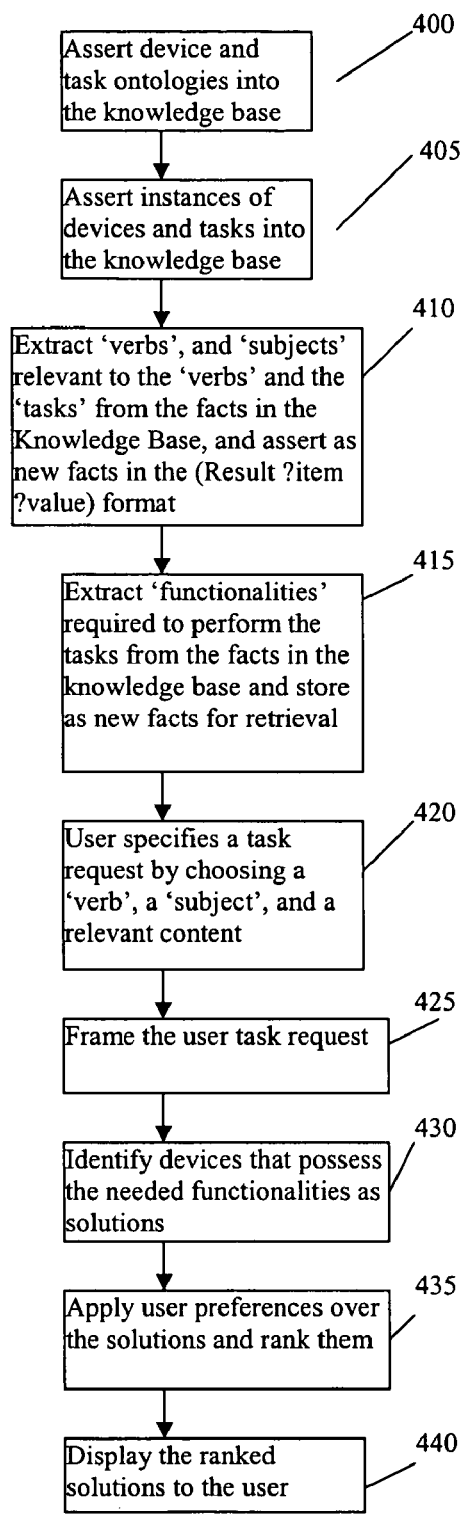
FIG. 6 shows a flow chart of example steps in generating and displaying task suggestions.

Now also referring to the flowchart steps of FIG. 6, an example operation scenario is now described:

1. In step 400, during start-up device and task Ontologies 110 are asserted into the Knowledge Base 105, wherein the ontology content is converted into a fact in the '(PropertyValue subclass man person)' format.
2. In step 405, instances of devices and tasks 115, 120 are also asserted into the Knowledge Base 105. In the example herein, ontologies 110 are implemented for Audio Visual (AV) devices e.g., TV, CD player, DVD Player, IPAQ, Speakers, Transcoder, etc.).
3. In step 410, after the ontologies 110 and instances 115, 120 are loaded, 'verbs', and 'subjects' relevant to the 'verbs' and the 'tasks' supported by the devices 40 are extracted from the facts in the Knowledge Base 105.
4. In step 415, in a similar manner, the 'functionalities' required to perform the tasks that are identified above, are also extracted from the facts in the Knowledge Base 105 and stored as new facts for easy retrieval.
5. In step 420, using the GUI 60, the user specifies/selects a task suggestion 95 by choosing e.g. a 'verb', a 'subject' relevant to the context of the 'verb', and a relevant content (which category is the chosen subject). The user can also specify a preferred location and/or an end-device 40 where the requested/selected task suggestion is to be performed.
6. In step 425, the device functionalities required to perform the task are identified (preferably, this information is previously computed and stored as easily retrievable facts, such that little time is consumed in this step).
7. In step 430, the task orchestration module 50 identifies the devices 40 that possess the needed functionalities as solutions. If the task requires numerous functionalities, the task orchestration module 50 identifies a set of devices 40 that can collectively perform/service the task.
8. In step 435, after identifying the set of devices 40 that can perform the user-selected task suggestion, the user preferences 130 are applied over the set of solutions and given a rank.
9. In step 440, the set of solutions are finally displayed to the user as output 75 in the increasing order of their ranks. An example ranking for a home network is where the LivingRoom in the home includes a Plasma-TV, a PC, Speakers and IPAQ. The user has set preferences such as: when playing a movie choose a device screen size greater than 40 inches, and when playing audio Speakers are preferred over IPAQ. For a Task Request "Play Movie 'The Matrix' in the LivingRoom", the task orchestration module 50 identifies the following combinations of devices (solutions) that can perform the requested/selected task suggestion: PC & Speakers, PC & IPAQ and Plasma-TV. The solutions are ranked according to the user's preferences above and displayed to the user as: (1) Plasma-TV, (2) PC & Speakers, (3) PC & IPAQ.

The user selects the most preferred combination of devices 40 among the solutions, and instantiates the task by using the task actions which in turn require device actions that use the device grounding 380 in the device description 320 (FIG. 5) to fulfill the task. As noted, once the user chooses a set of devices 40 to execute the requested task, the task orchestration module 50 invokes appropriate interfaces on the devices required for the task.

Figure 7:
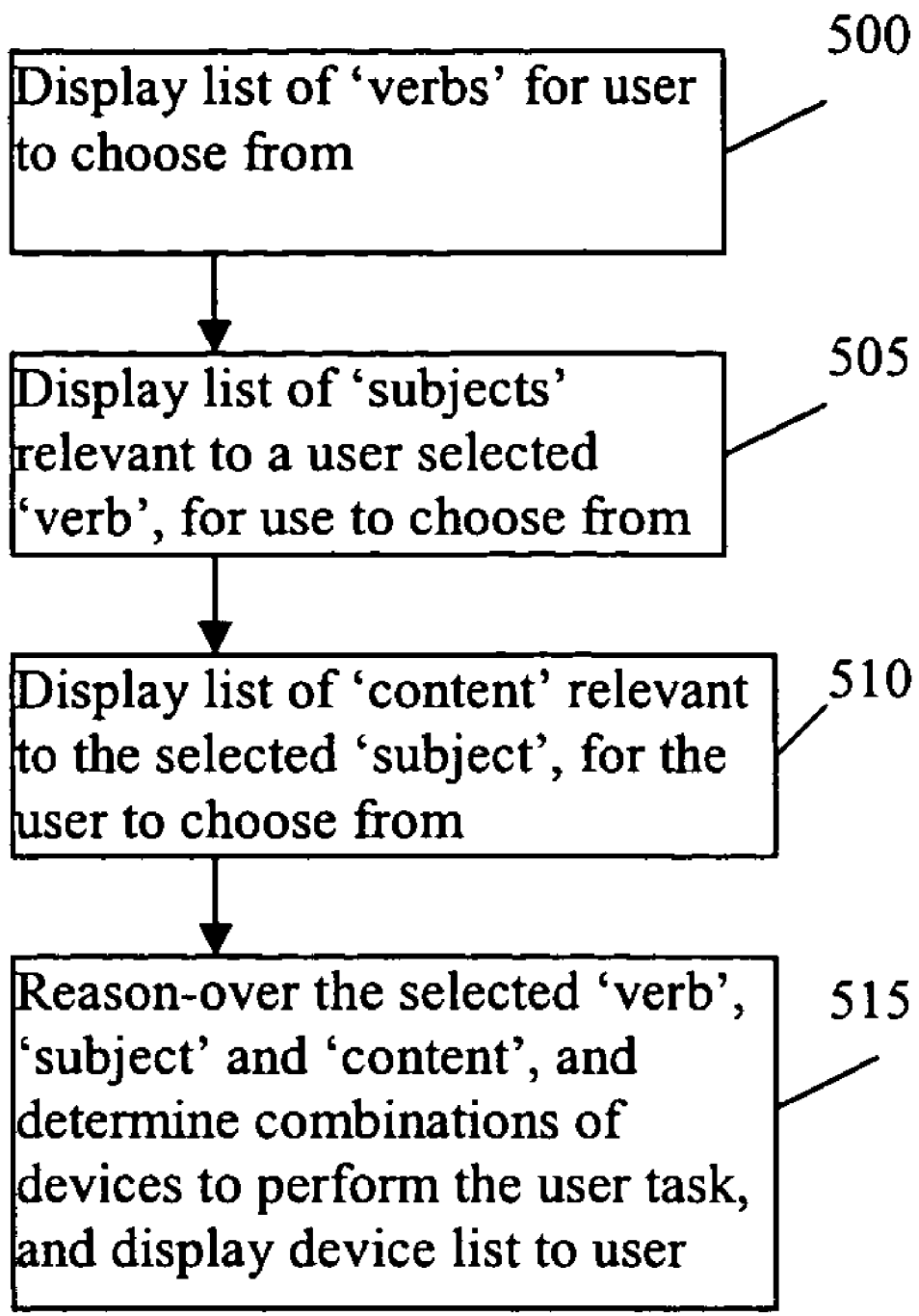
FIG. 7 shows a flow chart of example steps in displaying task suggestions to the user for selection and execution by the task orchestration module in the system of FIG. 2.

Referring to the flowchart steps of FIG. 7, in the following, an example operation of an embodiment of the user interface module 60 is described. The user can incrementally compose a task request using the GUI module in four steps as described by example below:

1. In step 500, a list of all valid 'verbs' is displayed in the GUI 60. The user can choose a 'verb' from the list and then click on 'Next' to continue to the next step (i.e., step 505). Anytime before clicking on 'Next' the user can change the 'verb' selected.
2. In step 505, a list of all the 'subjects' that are relevant to the chosen 'verb' is displayed in the GUI 60. The user can choose a 'subject' from the list and then click on 'Next' to proceed to the next stage (i.e., step 510). Anytime before clicking on 'Next' the user can change the 'subject' selected. The user can also click on 'Back' or 'StartOver' to go to the previous stage (i.e., step 500) and change the selected 'verb'.
3. In step 510, a list of all the 'content' relevant to the chosen 'subject' is displayed. The user can choose some 'content' from the list and then click on 'Next' to proceed to the next step (i.e., step 515). Anytime before clicking on 'Next' the user can change the 'content' selected. The user can also click on 'Back' to go to the previous step (i.e., step 505) and change the selected 'subject', or can click on 'StartOver' to go to the step 500 and change the selected 'verb'. During any of the above steps or at the end of step 510, the user can set the desired location for the task execution and/or the end-device to perform the entire task or a part of the task.
4. In step 515, the task orchestration module 50 internally reasons over the chosen 'verb', 'subject', 'content', the user preferences (such as the location, end-device set through the GUI and other preferences specified as facts and rules), and the facts about the existing devices and tasks that it possesses in its Knowledge Base 105. After reasoning, the task orchestration module 50 determines all possible combinations of devices (i.e., solutions) that can perform the requested task. The set of solutions obtained are ranked inside the task orchestration module 50 and finally displayed to the user via the GUI 60 (e.g., in the increasing order of the ranks). An example processing in step 515 is described below. The task orchestration module 50 reads in task and device descriptions, and stores that information as facts in the Knowledge Base 105. The inference engine 65 interprets the task and device descriptions, and deduces new information that is not specified directly in the task and device descriptions, but that is specified in the form of classes and properties, and relationships amongst them. The task orchestration module 50 can process and manipulate that information.

In one example, the basic steps involved in the task orchestration module 50 include:
1. Reading in task and device descriptions.
2. Applying semantics onto the task and device descriptions.
3. Using a parser to convert the task and device descriptions that are loaded into the Knowledge Base 105.
4. Applying other rules and queries as described above.

As noted, the ontologies 110 are framed as a mechanism to describe tasks, devices and user preferences. In general, an ontology is a specification of a conceptualization; it is a description (as in a formal specification of a program) of the concepts and relationships that can exist for an entity or a collection of entities (e.g., devices, users, etc.). In this example, devices and tasks are described based on their basic attributes/properties and/or functionalities provided or required The descriptions are encoded using a mark-up language wherein based on this description the user's task request could be understood, processed and served.

Further, 'Functionality+Content Type' attributes can be included in the ontologies 110. In the example implementation of ontologies 110 herein, for each functionality that a device 40 provides, it is also specified what kind of data is accepted as input (the content type), what sources the device 40 can accept the input from and what kind of data is produced as an output (if any). This is sufficient to answer requests that are very generic and that do not specify the content type. However, if the task orchestration module 50 is to provide content type-based lookup for devices 50, then a method of representing the functionality that includes the content type (e.g., mp3render), not as a separate attribute, is needed. This can be accomplished by inclusion of 'Functionality+Content Type' attributes can be included in the ontologies 110.

Additionally, an ontology for expressing user preferences 130 can be utilized. In the example implementation herein, preferences 130 can be expressed in a mark-up language similar to the way device instances 115 and task instances 120 are specified. In order to make such a description in a standard/universal format and to better express the relationship between the different attributes of a set of preferences, an ontology may be utilized, based on which, instances of a user's preferences can be framed.

Mechanisms to understand preferences can also be implemented. As an example, the task orchestration module 50 can understand a preference such as "Choose a device with a larger screen size when playing a movie". Preferably, the task orchestration module 50 can understand that "Plasma TV is always better than any other kind of TV, and even the one with the largest screen size". Further, more generic ontologies can be included that would be applicable for all kinds of devices, even those devices which are is unknown at time of implementation.

While the examples herein are related to consumer electronics and home networks, as those skilled in the art recognize, the present invention can be applied to other devices and architectures such as mobile personal devices, desktop tasks, complex enterprise systems, etc. Further, although in this description an embodiment of the task orchestration system has been described in conjunction with consumer electronics, those skilled in the art recognize that the present invention is useful in other application where a known set of entities interact into tasks and need a simple method for user orchestration of those entities (e.g., a production line to specify a variety of operations or configurations on assembly robots). Further, because logical device separations are made, there is no reason why they cannot be combined into physical devices. While a single controller/orchestration module is described herein by example, a set of devices may participate in controller actions or in determining orchestrations of devices.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of representing user tasks to be performed by interaction of a plurality of electronic devices in a task orchestration system, the method comprising:
employing a controller device for:
expressing device functionality as a device description specifying a function that the device can perform;
generating task suggestions based on task descriptions obtained from multiple electronic devices of the plurality of electronic devices, wherein task descriptions are dynamically determined at run-time of the task orchestration system, and a task description comprises task external description outlining task suggestions for interaction with a user, task properties, task functionalities and task actions, wherein each task suggestion represents a user task as an abstraction of one or more of the device descriptions;
applying user preferences over the generated task suggestions to determine a rank order for the generated task suggestions; and
displaying task suggestions in the rank order on a display for the user to select from,
whereby user tasks are decoupled from the devices.

2. The method of claim 1, further including expressing device interactions based on device descriptions and abstract device interactions, whereby device functionality and device interactions are logically separated, allowing description of the devices and a set of possible ways that the devices may interact.

3. The method of claim 2, wherein the task external description outlines task suggestions for interaction with a user.

4. The method of claim 3, wherein the task properties express information about the user task.

5. The method of claim 4, wherein task functionalities express functionality required to perform the user task.

6. The method of claim 5, wherein the task action describe the sequencing and combinations of the devices that fulfill the required functionalities.

7. The method of claim 1 wherein the device description comprises a device functionality description and device grounding.

8. The method of claim 7, wherein the functionality description outlines functionality of a device.

9. The method of claim 7, wherein the device grounding describes device control based on the functionality description.

10. The method of claim 6, further including using task descriptions and device descriptions to determine a set of devices that can perform a user task.

11. The method of claim 10, wherein a user task description comprises a semantic ontology that provides interoperable description and interchange of descriptions.

12. The method of claim 1, further including:
expressing sequential, parallel and coordinated device interactions to orchestrate functionality of the devices into performing user tasks.

13. A task orchestration system for a network of interconnected devices, comprising:
a task-driven controller device configured to obtain function descriptions from the interconnected devices, and to generate task suggestions based on the obtained device function descriptions, wherein function descriptions are dynamically determined at run-time of the task orchestration system, where the device function descriptions comprise task external description outlining task suggestions for interaction with a user, task properties, task functionalities and task actions, such that each task suggestion represents a user task as an abstraction of one or more of the obtained device descriptions, wherein device function is expressed as a device description specifying a function that a device can perform, whereby user tasks are decoupled from the devices; and
a user interface device that displays the task suggestions in rank order on a display for the user to select from, wherein the user task represented by the selected task suggestion is to be performed by one or more of the devices, and the rank order is based on user preferences.

14. The system of claim 13, wherein in the controller processor device interactions are expressed based on device descriptions and abstract device interactions, whereby device functionality and device interactions are logically separated, allowing description of the devices and a set of possible ways that the devices may interact.

15. The system of claim 13, wherein the controller processor device further generates task suggestion based on task descriptions, wherein a task description comprises task external description, task properties, task functionalities and task actions.

16. The system of claim 15, wherein the task external description outlines task suggestions for interaction with a user.

17. The system of claim 15, wherein the task properties express information about the user task.

18. The system of claim 15, wherein task functionalities express functionality required to perform the user task.

19. The system of claim 15, wherein the task action describe the sequencing and combinations of the devices that fulfill the required functionalities.

20. The system of claim 13 wherein the device description comprises a device functionality description and device grounding.

21. The system of claim 20, wherein the functionality description outlines functionality of a device.

22. The system of claim 20, wherein the device grounding describes device control based on the functionality description.

23. The system of claim 15 wherein the controller processor device uses the task description and device descriptions to determine a set of devices that can perform a user task.

24. The system of claim 15 wherein the user task description comprises a semantic ontology that provides interoperable description and interchange of descriptions.

25. The system of claim 13 wherein the controller processor device expresses sequential, parallel and coordinated device interactions to orchestrate functionality of the devices into performing user tasks.

26. The system of claim 15, wherein the controller processor device further:
frames device function descriptions as device ontologies;
frames task descriptions as task ontologies; and
uses the device and task ontologies to map the user selected task suggestion to tasks that can be performed by the available devices.

27. The method of claim 15, wherein the controller processor device further:

frames device function descriptions as device ontologies;
frames task descriptions as task ontologies; frames device instances based on device ontologies; frames task instances based on task ontologies; and
uses the device and task ontologies and instances to map the user selected task suggestions to tasks that can be performed by the available devices.

28. The system of claim 15, wherein the controller processor device further controls the device combinations to perform the selected user task suggestions.

29. The system of claim 15, wherein in conjunction with the controller processor device, the user interface device displays task suggestions that are possible given the available devices, tasks and device functionality.

30. The system of claim 15, wherein in conjunction with the controller processor device, the user interface device displays available task suggestions and options based on the device descriptions.

31. The system of claim 15, wherein each task description is expressed in an ontology language wherein devices express tasks to the controller processor device, such that the controller processor device determines the user task desired and matches the user task descriptions to devices for performing the user task.

32. The system of claim 15, wherein task properties express information useful about the task.

33. The method of claim 1, wherein the modifiers describe a time of day to apply to the task suggestions.

34. The method of claim 1, wherein the modifiers describe a particular location to apply to the task suggestions.

35. A task orchestration system for a network of interconnected devices, comprising:
a task-driven controller device configured to obtain function descriptions from the interconnected devices, and generate task suggestions based on the obtained device function descriptions, wherein task descriptions are dynamically determined at run-time of the task orchestration system such that each task suggestion is in a pseudo-sentence form and represents a user task as an abstraction of one or more of the obtained device descriptions, wherein device function is expressed as a device description specifying a device functionality description and device grounding, and task actions describe sequencing and combinations of the devices that fulfill the required functionalities, whereby user tasks are decoupled from the devices; and
a user interface device that displays the task suggestions in rank order on a display for the user to select from, wherein the user task represented by the selected task suggestion is to be performed by one or more of the devices, and the rank order is based on user preferences.

36. The method of claim 11, wherein generating task suggestions further comprises:
querying devices to obtain a set of terms for each position in a pseudo-sentence and modifiers that are possible for task suggestions.

37. The method of claim 36, wherein task suggestions comprise word combinations filled by descriptions of tasks located in devices.

38. The method of claim 37, wherein new devices having task descriptions are dynamically added at run-time of the task orchestration system.

39. A method of representing user tasks to be performed by interaction of a plurality of electronic devices in a task orchestration system, the method comprising:
employing a controller device for:
expressing device functionality as a device description specifying a function that the device can perform;
generating task suggestions based on task suggestions obtained from multiple electronic devices of the plurality of electronic devices, wherein task descriptions are dynamically determined at runt-time of the task orchestration system, and a task description comprises task external description outlining task suggestions for interaction with a user, task properties, task functionalities and task actions, wherein each task suggestion represents a user task as an abstraction of one or more of the device descriptions;
applying user preferences over the generated task suggestions to determine a rank order for the generated task suggestions; and
causing task suggestions to be displayed in the rank order on a display for the user to select from,
wherein user tasks are decoupled from the devices.

40. The method of claim 39, wherein the device description comprises a device functionality description and device grounding.

41. The method of claim 39, wherein the functionality description outlines functionality of a device.

42. The method of claim 39, wherein the device grounding describes device control based on the functionality description.

* * * * *